United States Patent
McGrath

(10) Patent No.: US 8,925,153 B1
(45) Date of Patent: *Jan. 6, 2015

(54) PULL-BUTTON, LOCKING HINGE ASSEMBLY

(71) Applicant: Andrew H. McGrath, Concord, CA (US)

(72) Inventor: Andrew H. McGrath, Concord, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/311,941

(22) Filed: Jun. 23, 2014

(51) Int. Cl.
*E05D 11/10* (2006.01)

(52) U.S. Cl.
CPC .................................. *E05D 11/1007* (2013.01)
USPC .............................................. 16/326; 16/334

(58) Field of Classification Search
CPC ............ E05D 11/1007; E05D 11/1028; E05D 11/1078; E05D 2011/10; E05D 2011/1028; E05D 2011/1035; E05D 2011/1092; E05D 15/502
USPC ........... 16/324, 326–328, 352, 353, 320, 321, 16/331, 335, 349, 371; 403/93, 94, 96, 97, 403/103, 104
See application file for complete search history.

(56) References Cited

U.S. PATENT DOCUMENTS

| | | | | |
|---|---|---|---|---|
| 5,039,118 | A * | 8/1991 | Huang | 280/47.371 |
| 5,123,768 | A * | 6/1992 | Franklin | 403/96 |
| 5,168,601 | A * | 12/1992 | Liu | 16/445 |
| 5,765,958 | A * | 6/1998 | Lan | 403/97 |
| 6,264,392 | B1 * | 7/2001 | Wise et al. | 403/112 |
| 6,629,801 | B2 * | 10/2003 | Cheng | 403/101 |
| 6,922,869 | B2 * | 8/2005 | Bivens et al. | 16/54 |
| 7,591,604 | B2 * | 9/2009 | Roberts | 403/101 |
| 7,617,569 | B2 * | 11/2009 | Liao | 16/334 |
| 7,631,575 | B2 * | 12/2009 | Gard et al. | 74/530 |
| 2002/0131814 | A1 * | 9/2002 | Hou et al. | 403/97 |
| 2004/0179891 | A1 * | 9/2004 | Watkins et al. | 403/96 |
| 2010/0218344 | A1 * | 9/2010 | Van Gennep | 16/327 |

* cited by examiner

*Primary Examiner* — Chuck Mah
(74) *Attorney, Agent, or Firm* — Charles L. Thoeming

(57) ABSTRACT

A pull-button, locking hinge assembly includes a base element, a pull-button element, a cap element, press fitted to arrange these three elements about a central axis, and a release assembly allowing the cap element to pivot 360 degrees transversely to the central axis and in relation to the base element. Geometric ends of the hinge assembly allow press fitted insertion into any two components to be so releasably pivoted and repositioned, and then locked into a desired position relative one to the other.

9 Claims, 2 Drawing Sheets

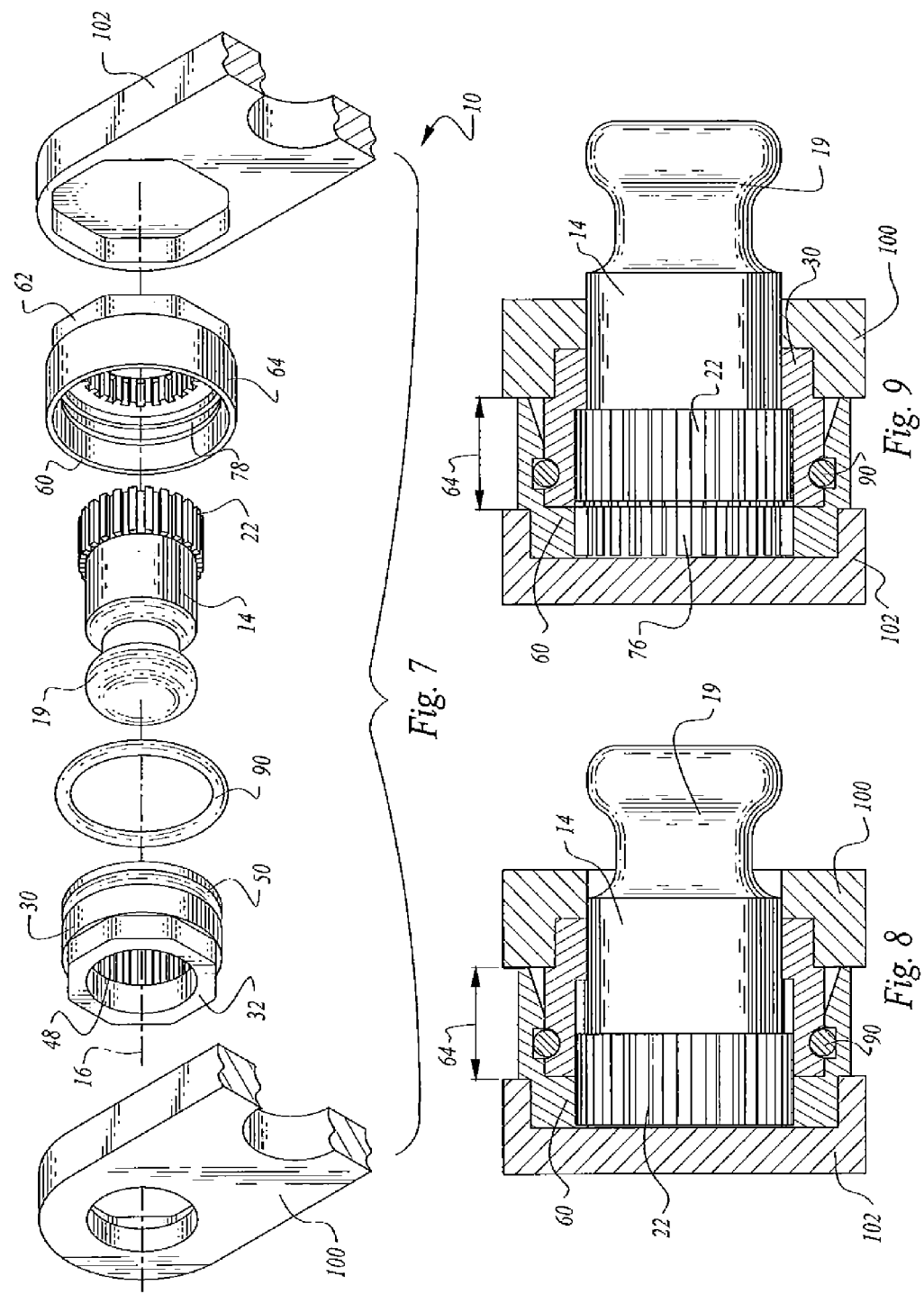

US 8,925,153 B1

PULL-BUTTON, LOCKING HINGE ASSEMBLY

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to a pull-button, locking hinge assembly that, for instance, is adaptable to ready-to-assemble components used in adjustable bracket assemblies for adapting to and connecting one or more substantially external support member(s) defined by the particular utility of the overall assembly to at least one fixed support structure, and for providing a locking hinge assembly to positionally adjust and secure a planar member 360 degrees about a central hinge axis orthogonally disposed to the support structure.

BACKGROUND OF THE INVENTION

Adjustable and lockable hinge assemblies for bracketing are well known in the art and typically comprise a limited degree of range of motion aligned with a central hinge axis, as exemplified by door hinge assemblies.

Designing and assembling these hinge elements is ordinarily complicated since dimensions, load factors, code requirements, and aesthetics converge to present brackets which are labor and component intensive. Often bracketing assemblies will have many component parts and require several tools for assembly. Moreover, with current technology, bracket assembly require broader ranges of hinge adaptability than what is provided in the art, and even when a custom design is presented, the bracket assembly is time consuming.

Various types of adjustable and lockable hinge assemblies are used for securing bracketing components or bracketing assemblies integrally or to other external structures, and/or immobilizing and/or adjusting one component with respect to another component about a common axis. Many ready to assemble bracket assemblies utilize location dependent uprights or support members that multiply the effort needed to design and assemble adjustable and lockable hinge assemblies and that intensify the complexity of the process.

Presently most adjustable and lockable hinge assemblies for bracketing are installed by the seller because of the complexity of assembling. Thus, many bracketing assemblies are handled fully or most fully assembled which presents bulky cargo that takes up considerable amount of space and is difficult to transport.

Additionally, when one part of a piece of an adjustable and lockable hinge assembly is damaged, often the entire product must be returned instead of the damaged part. For example, often when an adjustable and lockable hinge element for an upright or support bracketing assembly fails or is defective the entire bracketing assembly must be replaced.

Finally, the adjustable and lockable hinge assembly needs to be supported by adequate and aesthetically pleasing attachment components for securing one or more of the hinge assemblies to one or more bracket assemblies or fixed support structures.

DISCLOSURE OF INVENTION

The present invention relates to adjustable and lockable hinge assemblies that can be employed readily over a wide array of bracketing applications to securely connect a variety of longitudinally oriented support members to at least one fixed support structure, while still satisfying the complement of requirements presented by dimensions, load factors, codes, and design preferences. Furthermore, the adjustable and lockable hinge assemblies disclosed and claimed herein are fashioned in such a manner as to maximize the utility of the embodiments of hinge assemblies over a broad range of applications, while minimizing the labor, parts and tools required for implementation. Since the adjustable and lockable hinge assemblies are is characterized by their universality and relative simplicity and ease of installation, they serve to fulfill both original and retrofit adjustable and lockable hinge requirements for bracketing applications. The adjustability feature of the adjustable and lockable means that less "design customizing" is required for a given installation, thus leading to demonstrable cost savings.

For example, without limitation, an embodiment of the adjustable and lockable hinge assembly is adaptable to bracket assemblies for mounting, positioning and securing longitudinally disposed bracket panel members to at least one fixed support structure, and allowing for 360 degree positional adjustment of the longitudinally disposed bracket panel members along the adjustable and lockable hinge central axis.

The adjustable and lockable hinge assembly provides a pull-button, locking hinge assembly that includes a base element, a pull-button element, a cap element, an assembly to lock these three elements about a central axis, and a release assembly allowing the cap element to pivot 360 degrees transversely to the central axis and in relation to the base element. Geometric ends of the hinge assembly allow insertion into any two components to be so releasably pivoted and reposition, and then locked into a desired position relative one to the other.

BRIEF DESCRIPTION OF DRAWINGS

Further features and advantages will become apparent from the following detailed description made with reference to the accompanying drawings, wherein:

FIG. 7 is an exploded perspective view of the embodiment of pull-button, locking hinge assembly of FIGS. 1-6.

FIG. 8 is a cross-sectional view of FIG. 5 taken at "8-8."

FIG. 9 is a cross-sectional view of FIG. 6 taken at "9-9."

MODES FOR CARRYING OUT THE INVENTION

This detailed description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to various assemblies using the pull-button, locking hinge assembly for securing bracketing components or bracketing assemblies integrally or to other external structures, and/or immobilizing and/or adjusting one component with respect to another component about a common axis, the exemplary features and embodiments of the present application may additionally or alternatively be applied to other types of locking hinge arrangements, including, for example, various types of portable screens, panel bracketing, extending ladders, extending support hinges, folding hinges, rotisserie assemblies, frame hinges, hinges that permanently attach, releasably attach, and/or remain detached from a bracketing assembly, or other assembly providing one or more paired components to be rotated and secured, one relative to the other, and other types of uses, for example, with other portable items, such as, without limitation, sneeze guard assemblies, screens, tables, beds, panel stands, lecterns, carrying racks, storage racks, furniture, grills, tools, and electronic devices.

Further, persons with skill in the art understand that the terms "press fit" and "interference fit" are synonymous terms for a fit wherein one of the mating parts of an assembly is forced into a space provided by the other part in such a way that the condition of maximum metal overlap is achieved.

Figure 1:
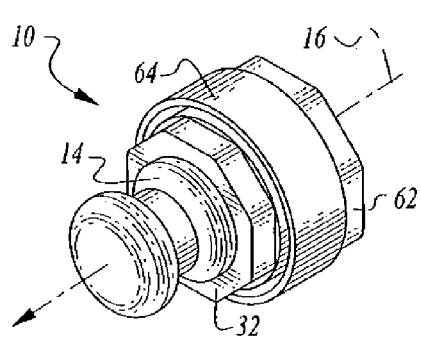
FIG. 1 is a front perspective view of an embodiment of a pull-button, locking hinge assembly 10 in a locked position that includes a base element having a solid cast geometric end 32, a cap element having a solid cast geometric end 62 and a cylindrical length 64, a pull-button 14, and a central longitudinal axis 16.
Figure 2:
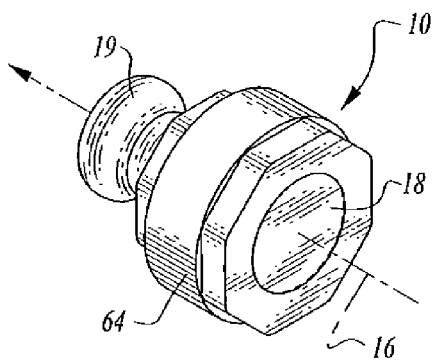
FIG. 2 is a rear perspective view of the embodiment of a pull-button, locking hinge assembly 10 of FIG. 1.
Figure 3:
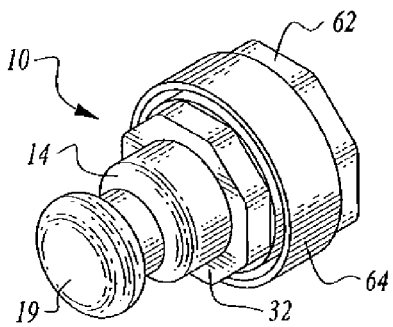
FIG. 3 is a front perspective view of the embodiment of a pull-button, locking hinge assembly 10 of FIG. 1 in an unlocked position after the pull-button 14 has been engaged and pulled outward along the central longitudinal axis 16.
Figure 4:
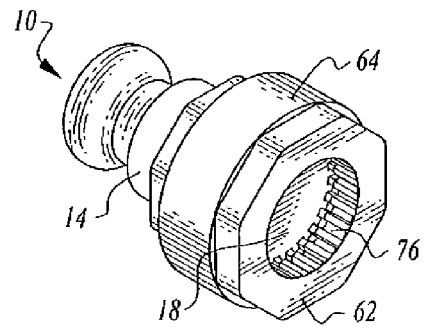
FIG. 4 is a rear perspective view of the embodiment of a pull-button, locking hinge assembly 10 of FIG. 3.
Figure 5:
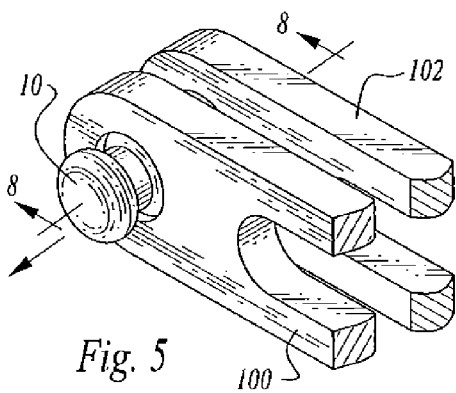
FIG. 5 is a front perspective view of the embodiment of a pull-button, locking hinge assembly of FIGS. 1-4 in a locked position and housed within corresponding external member components 100 and 102.
Figure 6:
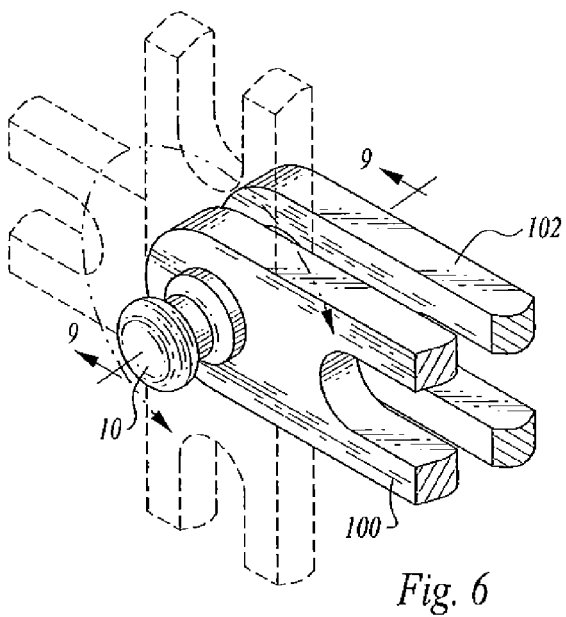
FIG. 6 is a front perspective view of the embodiment of a pull-button, locking hinge assembly of FIG. 5 in an unlocked position providing 360 degree range of movement of one external member with respect to the other about the central longitudinal axis.

Referring now to FIG. 1-9, a pull-button, locking hinge assemblies is illustrated and designated by reference numeral 10.

An embodiment of a pull-button, locking hinge assembly 10 further includes a pull-button element 14 including a cylindrical body having an external side and a central longitudinal axis 16, FIGS. 1-9. The pull-button element 14 provides a non-actuating end 18 including a solid circular external surface. The pull-button element 14 further provides an actuating end arm 19. A plurality of pull-button element 14 cogs 22 are evenly spaced along the pull-button element 14 cylindrical body external side so that each cog 22 length is disposed equidistant from and parallel to the pull-button element 14 cylindrical body central longitudinal axis 16. The pull-button element 14 actuating end arm 19 is accessible through the base element 30 solid cast geometric first open end 32.

The base element 30 cogs 48 are sized to fit and receive the pull-button element 14 cogs 22 along the base element 30 cylindrical length internal side from the second open end, FIGS. 1-9.

An annular groove 50 around the base element 30 cylindrical length defines a plane transverse to the central longitudinal axis 16, and the annular groove 50 is sized to receive and hold an O-ring 90, FIGS. 7-9. Embodiments of the pull-button, locking hinge assembly 10 include use of an O-ring lubricant, such as DuPont® Krytox®, or Dow Corning® III O-Ring Valve Silicone Lubricant, or similar products to maintain the ease of motion for the pivot of the cap element 60 around the base element 30 along O-ring 90 within annular grooves, 78 and 50, respectively.

An embodiment of a pull-button, locking hinge assembly 10 further includes a pull-button element 14 including a cylindrical body having external and internal sides and a central longitudinal axis 16, FIGS. 1-9. The pull-button element 14 provides a non-actuating end 18 including a solid circular external surface. The pull-button element 14 further provides an actuating end arm 19. A plurality of pull-button element 14 cogs 22 are evenly spaced along the pull-button element 14 cylindrical body external side so that each cog 22 length is disposed equidistant from and parallel to the pull-button element 14 cylindrical body central longitudinal axis 16. The pull-button element 14 actuating end arm 19 is accessible through the base element 30 solid cast geometric first open end 32.

An embodiment of a pull-button, locking hinge assembly 10 further includes a cap element 60 having a solid cast geometric first open end 62 and a central longitudinal axis 16, FIGS. 1-9. The cap element 60 provides an opening centered on the solid cast geometric end 62, the opening sized to receive the pull-button element non-actuating end 18. The cap element 60 includes a cylindrical length 64 comprising an external side and an internal side, and a cylindrical recess defined by the cylindrical length internal sides 68. A cap element 60 second open end is sized to be press fitted onto, and to receive and hold, the base element 30 second open end. A plurality of cap element 60 uniform cogs 76 are evenly spaced along the cap element 60 cylindrical length 64 internal sides, so that each cog 76 length is disposed equidistant from and parallel to the cap element 60 cylindrical length 64 central longitudinal axis 16. An annular groove 78 around the cap element 60 cylindrical length 64 internal side defines a plane transverse to the cap element 60 central longitudinal axis 16, and is sized to receive and hold the O-ring 90 received within the annular groove 50 around the base element 30 cylindrical length external side, FIGS. 7-9.

An embodiment of the pull-button, locking hinge assembly 10 provides a locking feature when the pull-button element 14 actuating end arm 19 is in a disengaged, neutral position and the pull-button element 14 cogs 22 simultaneously engage the base element 30 cogs 48 and the cap element 60 cogs 76 preventing any pivot about the central longitudinal axis 16.

An embodiment of the pull-button, locking hinge assembly 10 provides a 360 degree pivot feature between the cap element 60 and the base element 30, the pivot action being transverse to and about the central longitudinal axis 16 with the cap element 60 and the base element 30 pivoting around each other along the O-ring 90, when the pull-button element 14 actuating end arm 19 is engaged and pulled outward from the base element 30 solid cast geometric first open end 32 disengaging the pull-button element 14 cogs 22 from the cap element 60 cogs 76 and unlocking the pull-button, locking hinge assembly 10, FIGS. 3-6, 8, and 9. Once the pull-button element 14 actuating end arm 19 returns to a neutral position by pushing the actuating end arm 19 inward from the base element 30 solid cast geometric first open end 32, the pull-button element 14 cogs 22 re-engage the cap element 60 cogs 76 and lock the pull-button, locking hinge assembly 10 into the adjusted pivoted position between the base element 30 and the cap element 60 about the central longitudinal axis 16.

Embodiments of the pull-button, locking hinge assembly 10 include use of an O-ring lubricant, such as DuPont® Krytox®, or Dow Corning® III O-Ring Valve Silicone Lubricant, or similar products to maintain the ease of motion for the pivot of the cap element 60 around the base element 30 along O-ring 90 within annular grooves, 78 and 50, respectively.

Embodiments of the pull-button, locking hinge assembly 10 provide the cap element 60 solid cast geometric first open end 62 and the base element 30 solid cast geometric first open end 32 which include, without limitation, geometric shapes of ovals, oblongs, triangles, squares, rectangles, pentagons, hexagons, heptagons, octagons, and other multi-sided polygons capable of being press fitted into corresponding, geometric shapes of external member components to securely hold the pull-button, locking hinge assemblies 10 between the corresponding external member components (i.e., 100 and 102, FIGS. 5, 6, 8 and 9) while transferring directional forces applied to the external member components, 100 and 102, to and through the pull-button, locking hinge assembly 10. The cap element 60 cylindrical length 64 serves as a spacer between the corresponding external member components interference fitted onto embodiments of the pull-button, locking hinge assembly 10 (i.e., 100 and 102, FIGS. 8 and 9).

The pull-button element 14, the base element 30, and the cap element 60 of embodiments of the pull-button, locking hinge assemblies 10 can be manufactured from brushed aluminum, high strength carbon-composites, steel, stainless steel, and any similar light weight, high strength metal alloys. The preferred embodiment of the pull-button, locking hinge assembly 10 consists of brushed aluminum.

Therefore, the foregoing is considered as illustrative only of the principles of the pull-button, locking hinge assemblies. Additionally, since numerous modifications and changes will readily occur to those skilled in the art, it is not desired to limit the pull-button, locking hinge assemblies to the exact construction and operation shown and described, and further, all suitable modifications and equivalents may be resorted to, falling within the scope of the pull-button, locking hinge assemblies.

I claim:

1. A pull-button, locking hinge assembly comprising, in combination:
   a) a base element comprising: a solid cast geometric first open end comprising an internal recess; a cylindrical length comprising an external side and an internal side; a central longitudinal axis; a cylindrical recess defined by the cylindrical length internal side; a second open end; a plurality of uniform cogs evenly spaced along the cylindrical length internal side from the second open end so that each cog length is disposed equidistant from and parallel to the central longitudinal axis, and the cogs are sized to fit and receive cogs along a pull-button cylindrical body external side; and an annular groove around the cylindrical length external side, the annular groove defining a plane transverse to the central longitudinal axis;
   b) a pull-button element comprising: a cylindrical body comprising an external side; a central longitudinal axis; an non-actuating end comprising a solid circular external surface; an actuating end comprising an arm; a plurality of cogs evenly spaced along the cylindrical body external side so that each cog length is disposed equidistant from and parallel to the cylindrical body central longitudinal axis;
   c) a cap element comprising: a solid cast geometric first open end comprising a central opening on the end sized to receive the pull button non-actuating end; a cylindrical length comprising an external side and an internal side; a central longitudinal axis; a cylindrical recess defined by the cylindrical length internal sides; a second open end sized to be press fitted about the base second open end to receive and hold the base second open end; a plurality of uniform cogs evenly spaced along the cylindrical length internal side from the cap element first open end comprising a central opening to receive the pull button non-actuating end so that each cog length is disposed equidistant from and parallel to the central longitudinal axis, and the cogs are sized to fit and receive the cogs along the pull-button cylindrical body external side; and an annular groove around the cap cylindrical length internal side, the annular groove defining a plane transverse to the base central longitudinal axis;
   d) an O-ring sized to be received within (i) the annular groove around the base cylindrical length external side, and (ii) the annular groove around the cap cylindrical length internal side, the O-ring serving to provide a pivot surface between the base element and the cap element;
wherein the pull-button, locking hinge assembly provides a locking feature when the pull-button element actuating end arm is in a disengaged, neutral position and the pull-button element cogs simultaneously engage the base element cogs and the cap element cogs preventing any pivot between the base element and the cap element about the central longitudinal; axis;
wherein the pull-button, locking hinge assembly provides a 360 degree pivot feature around the O-ring between the cap element and the base element, the pivot action being along a plane transverse to the central longitudinal axis and about the central longitudinal axis, when the pull-button actuating end arm is engaged and pulled outward from the base element solid cast geometric first open end disengaging the pull-button element cogs from the cap element cogs and unlocking the pull-button, locking hinge assembly; and
wherein once the pull-button element actuating end external surface returns to a neutral position by the action of pressing the pull-button element actuating end arm inward from the base element solid cast geometric first open end, the pull-button element cogs re-engage the cap element cogs and lock the pull-button, locking hinge assembly into the adjusted pivoted position between the base element and the cap element about the central longitudinal axis.

2. The pull-button, locking hinge assembly of claim 1, wherein the cap element solid cast geometric first open end and the base element solid cast geometric first open end comprise geometric shapes selected from the group consisting of ovals, oblongs, triangles, squares, rectangles, pentagons, hexagons, heptagons, octagons, and other multi-sided polygons capable of being press fitted into corresponding geometric shaped openings in external member components to securely hold the pull-button, locking hinge assembly between the corresponding external member components and transfer directional forces applied to the external member components to the pull-button, locking hinge assembly.

3. A pull-button, locking hinge assembly comprising, in combination:
   a) a first housing comprising: an octagonal first open end; a second open end; a cylindrical length comprising an internal surface, an external surface, and a recess between the first housing octagonal first open end and the first housing second open end; a plurality of uniform cogs evenly spaced along the cylindrical length internal surface from the second open end so that each cog length is disposed equidistant from and parallel to a central longitudinal axis, and each cog is sized to fit and receive similarly disposed cogs along a pull-button cylindrical body external surface; and an annular groove around the first housing cylindrical length external surface, the annular groove defining a plane transverse to the central longitudinal axis;

b) a second housing comprising: an octagonal first open end comprising a centered aperture; an second open end sized to be press fitted onto the first housing second open end to receive and hold the first housing; a cylindrical length comprising an external surface, an internal surface, and a recess between the second housing octagonal first open end and the second housing second open end; a plurality of uniform cogs of evenly spaced along the cylindrical length internal side proximate to the second housing octagonal first open end so that each cog length is disposed equidistant from and parallel to a central longitudinal axis, and each cog is sized to fit and receive the cogs along a pull-button cylindrical body external surface; and an annular groove around the second housing cylindrical length internal surface, the annular groove defining a plane transverse to the central longitudinal axis;

c) a pull-button member comprising: a cylindrical body sized to be housed within the first housing and the second housing, the cylindrical body comprising an external surface, an non-actuating end sized fit flush in the second housing octagonal first open end centered aperture; an actuating end comprising an arm; a plurality of cogs evenly spaced along the pull-button member cylindrical body external surface so that each cog length is disposed equidistant from and parallel to a pull-button member cylindrical body central longitudinal axis; and d) an O-ring sized to be received in a channel formed by the annular groove around the first housing cylindrical length external surface and the annular groove around the second housing cylindrical length internal surface once the first housing second open end is press fitted into and received by the second housing second open end;

wherein the pull-button, locking hinge assembly provides a locking feature when the pull-button member cogs simultaneously engage the first housing cogs and the second housing cogs thus locking the hinge assembly and preventing any pivot between the first housing and the second housing about the central longitudinal; axis; and wherein the pull-button, locking hinge assembly provides a 360 degree pivot feature around the O-ring between the first housing and the second housing, the pivot action being along a plane transverse to the central longitudinal axis and about the central longitudinal axis, when the pull-button actuating end arm is pulled outward through the first housing first open end disengaging the pull-button member cogs from the second housing cogs and unlocking the hinge assembly; and wherein once pull-button actuating end arm is pushed inward through the first housing first open end and the pull-button member cogs re-engage the second housing cogs, the hinge assembly is once again locked into an adjusted pivoted position between the first housing and the second housing about the central longitudinal axis.

4. A pull-button, locking hinge assembly comprising, in combination:

a) a rotatable housing comprising (i) two ends, each rotatable housing end sized to be press-fitted into and held by separate components to provide a pivot point between the separate components along a rotatable housing central longitudinal axis, each rotatable housing end comprising internal and external surfaces, and one rotatable housing end comprising an aperture from an external surface to an internal surface; (ii) a first cylindrical length between the rotatable housing ends, the cylindrical length comprising a first external surface and a first internal surface, and a first recess, the cylindrical length attached to the rotatable housing end comprising the aperture from the external surface to the internal surface, whereby the first external surface defines a space between the separate components once the rotatable housing has been press-fitted to and held by the separate components; (iii) a pull-button element within the rotatable housing, the pull-button element comprising a cylindrical body sized to be housed within rotatable housing ends, the cylindrical body comprising an external surface, and an actuating end arm sized to be accessed and activated through the rotatable housing end comprising the aperture;

b) locking means along the rotatable housing central longitudinal axis to contact the pull-button element and the rotatable housing ends in a first position and to contact the pull-button element and the rotatable housing end with the access aperture to the pull-button element actuating end in a second position; and c) pivot means to rotate an unlocked rotatable housing end 360 degrees about the locked housing end along a plane orthogonal to the rotatable housing central longitudinal axis;

whereby pulling force applied to the pull-button element actuating end arm provides the locking means second position;

whereby the locking means second position provides 360 degrees of rotation of the separate component attached to the rotatable housing end with access aperture to the pull-button element actuating end along a plane orthogonal to the rotatable housing central longitudinal axis about the rotatable housing end without access to the pull-button element arm; and whereby the locking means first position locks the pull-button, locking hinge assembly and the separate components into a fixed arrangement along the rotatable housing central longitudinal axis.

5. The pull-button, locking hinge assembly of claim 4, wherein the rotatable housing end with the access aperture to the pull-button element actuating end further comprises a second extended cylindrical length comprising a second internal surface, the second external surface comprising a second annular groove around the second cylindrical length external surface, and a second recess, and wherein the first internal surface comprises a first annular groove around the first cylindrical length internal surface, wherein the a second external surface is sized to be press fitted into and received by the first internal surface such that the first annular groove and the second annular groove are aligned to provide a channel orthogonal to the rotatable housing central longitudinal axis.

6. The pull-button, locking hinge assembly of claim 5, wherein the pivot means to rotate an unlocked rotatable housing end 360 degrees about the locked rotatable housing end along a plane orthogonal to the rotatable housing central longitudinal axis comprises an O-ring housed within the channel.

7. The pull button, locking hinge assembly of claim 6, wherein the locking means along the housing central longitudinal axis to contact the pull-button element and the rotatable housing ends in a first position and to contact the pull-button element and the rotatable housing end without the access aperture to the pull-button element actuating end in a second position comprises evenly spaced and sized cog lengths along the first internal surface, along the second internal surface, and along the pull-button element cylindrical body external surface, the cog lengths disposed equidistant from and parallel to the central longitudinal axis.

8. The pull-button, locking hinge assembly of claim 7, wherein the rotatable housing ends, pull-button element, and cogs comprise materials selected from the group consisting of brushed aluminum, high strength carbon-composites, steel, stainless steel, and any similar light weight, high strength metal alloys.

9. The pull-button, locking hinge assembly of claim 8, further comprising an O-ring lubricant to maintain the ease of motion for the O-ring to rotate one rotatable housing end 360 degrees about the corresponding rotatable housing end along a plane orthogonal to the rotatable housing central longitudinal axis when the locking means second position is provided.

* * * * *